(12) United States Patent
Horigome

(10) Patent No.: US 6,280,058 B1
(45) Date of Patent: Aug. 28, 2001

(54) ILLUMINATION SYSTEM

(75) Inventor: Shuhei Horigome, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/426,190

(22) Filed: Oct. 25, 1999

(30) Foreign Application Priority Data

Oct. 26, 1998 (JP) .................................................. 10-304198

(51) Int. Cl.[7] ................................. F21V 5/04; G02B 9/10
(52) U.S. Cl. ......................... 362/268; 359/661; 359/795; 359/800
(58) Field of Search ................................... 362/268, 331; 359/661, 795, 641, 798–800

(56) References Cited

U.S. PATENT DOCUMENTS

| | | | |
|---|---|---|---|
| 4,113,344 | * | 9/1978 | Shoemaker ............................ 359/382 |
| 5,245,384 | * | 9/1993 | Mori ....................................... 355/67 |
| 5,654,832 | * | 8/1997 | Kawasaki et al. .................... 359/794 |

FOREIGN PATENT DOCUMENTS

| | | |
|---|---|---|
| 46-18781 | 5/1971 | (JP) . |
| 46-18782 | 5/1971 | (JP) . |
| 6-118301 | 4/1994 | (JP) . |
| 6-214155 | 8/1994 | (JP) . |

* cited by examiner

*Primary Examiner*—Alan Cariaso
(74) *Attorney, Agent, or Firm*—Pillsbury Winthrop LLP

(57) ABSTRACT

An illumination system which ensures a numerical aperture larger than the orientation characteristics of a light sources and achieves uniform yet bright illumination is provided. The illumination system includes a light source, a collector lens constructed and arranged to converge light emitted from the light source to substantially parallel light beams and a relay lens constructed and arranged to transmit the substantially parallel light beams to an objective. The collector lens includes a first positive lens group, a second negative lens group, and at least one aspheric optical element. The working distance WD of the collector lens satisfies $0.5 < WD/f < 1.5$ . . . (1) where WD is the distance from the center of the light source to the apex of a surface in the collector lens, the surface is located nearest to the light source side, and f is the focal length of the collector lens.

8 Claims, 5 Drawing Sheets

FIG. 3
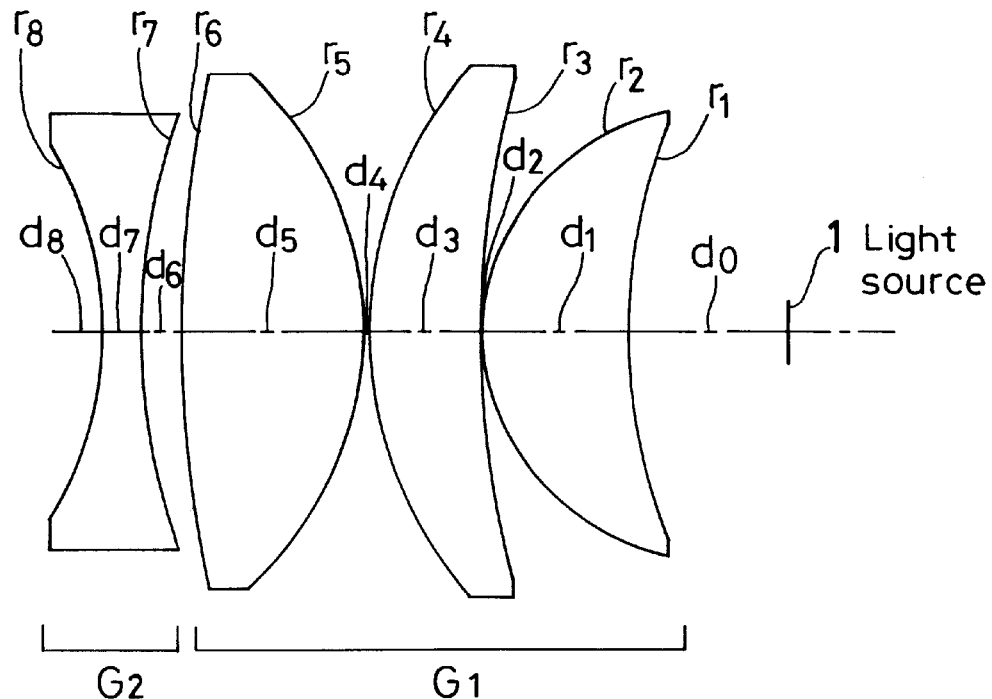
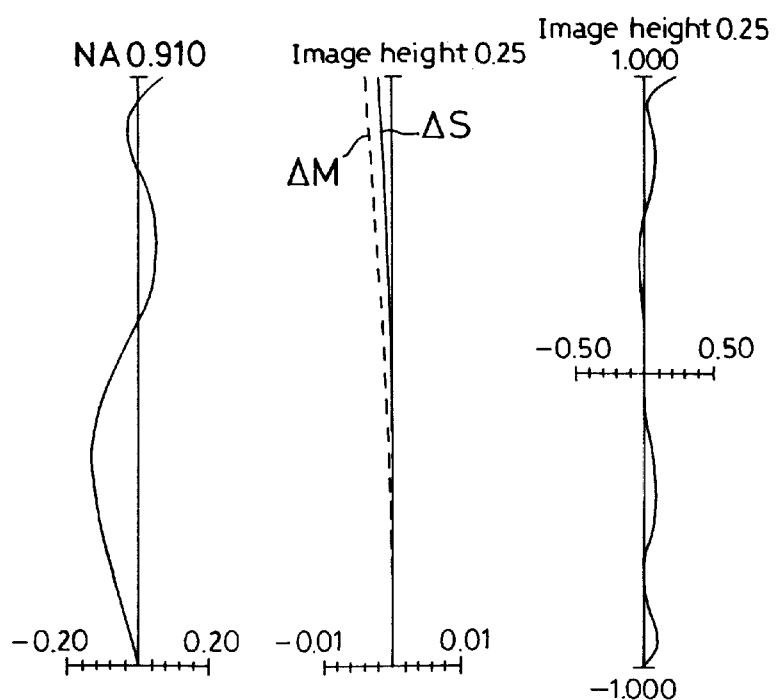
FIG.4(a) FIG.4(b) FIG.4(c)

FIG. 5
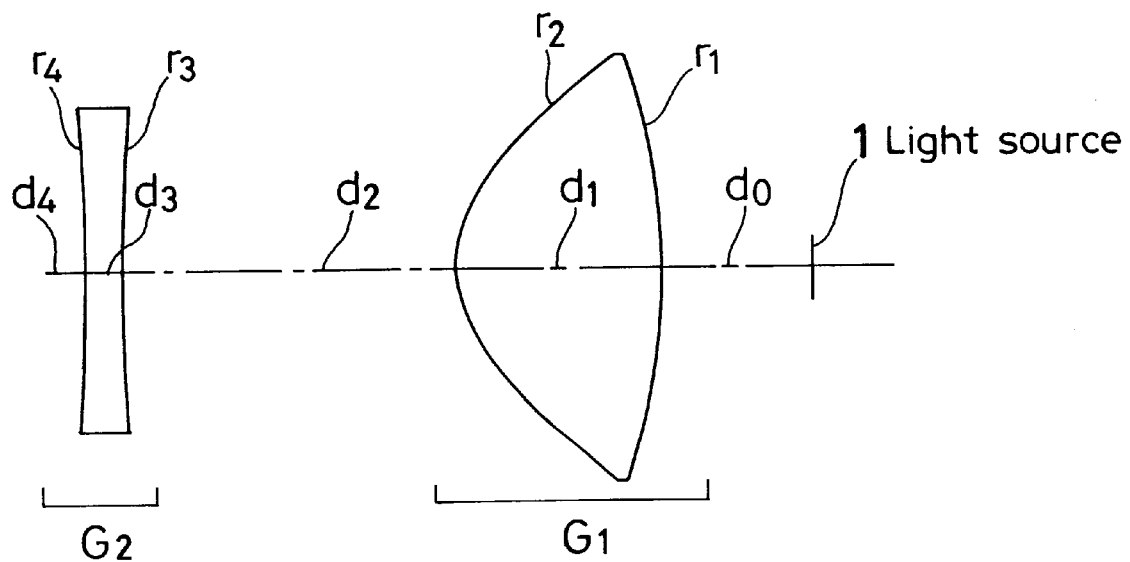
FIG. 6(a)  FIG. 6(b)  FIG. 6(c)
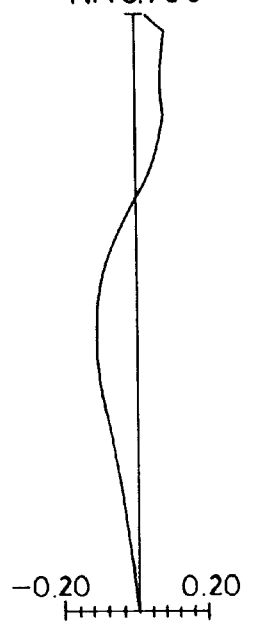
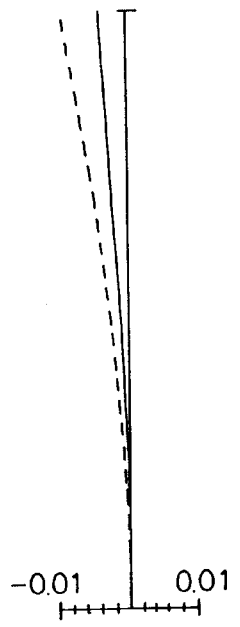
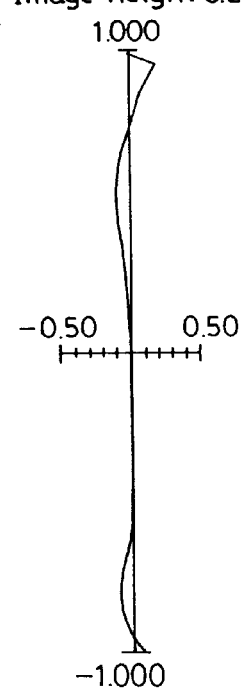

FIG. 9
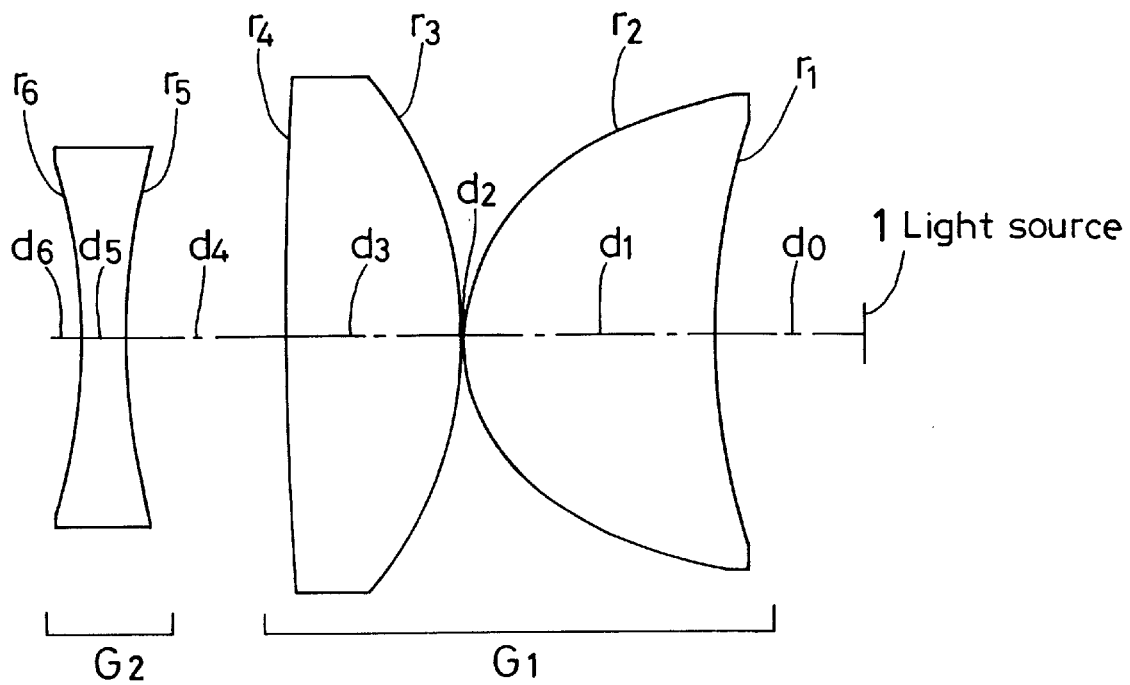
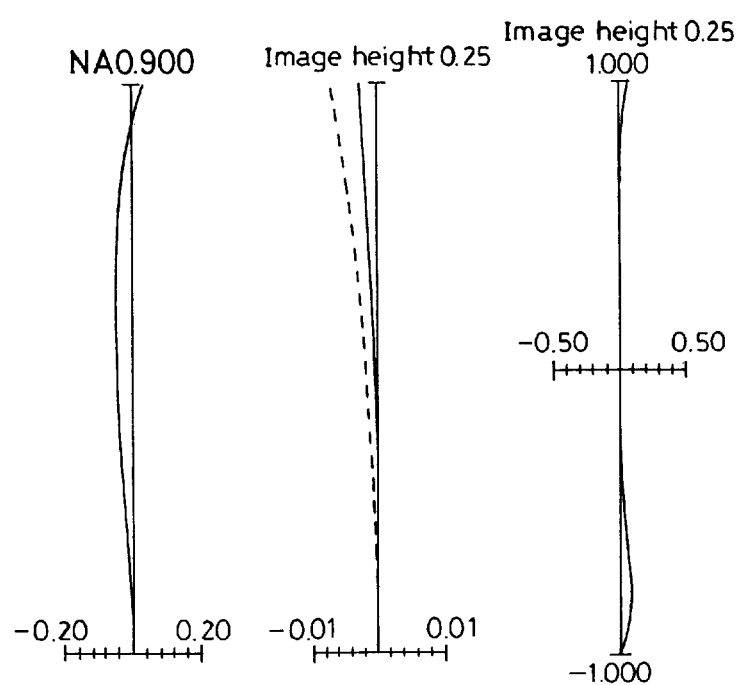
FIG.10(a)    FIG.10(b)    FIG.10(c)

ILLUMINATION SYSTEM

BACKGROUND OF THE INVENTION

The present invention relates generally to an illumination system, and more specifically to an illumination optical system designed for microscopes, etc. and including an aspheric optical element.

Among optical systems for converting light emitted from a light source by a collector lens into substantially parallel light beams and transmitting the substantially parallel light beams to an objective by way of a relay lens, for instance, there is a vertical incident illumination optical system for microscopes. Köbhler illumination is widely applied to the vertical incident illumination optical system for microscopes, as generally set forth below. FIG. 1 is a general schematic of Köhler illumination. Typically, the vertical incident illumination optical system is made up of, in order from a light source side, a light source 1, a collector lens 2, a relay optical element 3, an aperture stop 4, a field stop 5, a relay optical element 6, a reflecting element 7 such as a half-silvered or dichroic mirror, and an objective 9. Light emitted from the light source 1 is converted by the collector lens 2 into substantially parallel light beams to project a light source image by the relay optical element 3 onto the position of the aperture stop 4. Then, the light source image is used as a secondary light source to project it by the relay optical element 5 onto the vicinity 8 of the pupil position of the objective 9, thereby illuminating an object surface 10 in a uniform and bright manner. The field stop 5 is projected onto the object surface 10 through the relay optical element 6 and the objective 9.

Reference is here to made to Lagrange-Helmholtz equation.

$$\phi \times \theta \geq \Phi \times \Theta \qquad (a)$$

where:

- $\phi$ is the size of a light emitting portion of the light source,
- $\theta$ is the numerical aperture of the collector lens on the light source side,
- $\Phi$ is the range of illumination on the object surface, and
- $\Theta$ is the numerical aperture on an object surface side (limited by the numerical aperture of the objective).

From this equation, it is found that, to provide as uniform and bright illumination of viewing field as possible, the light emitting portion of the light source 1 should give out light uniformly, and the product of the size of the light emitting portion of the light source 1 and the numerical aperture of the collector lens 2 on the light source side should be greater than that of the numerical aperture of the objective 9 and the viewing range. To this end, it is required to use for the light source 1 a light source having as uniform and large a light emitting portion as possible and increase the numerical aperture of the collector lens 2. However, it is difficult to make the light emitting portion of the light source uniformly large. To obtain uniform and bright illumination, it is thus required to increase the numerical aperture of the collector lens 2 on the light source 1 side. The light source 1, for instance, a mercury vapor lamp, has such orientation characteristics as shown in FIG. 2, and so it is desired that the numerical aperture of the collector lens 2 on the light source 1 side be beyond the limits of orientation characteristics. For this purpose, an effort has been made to increase the numerical aperture of the collector lens 2 on the light source 1 side.

As well known in the art, the aspherical effect is effective to make correction for spherical aberration and the amount of deviation from the sine condition. In other words, it is possible to use one or more aspheric surfaces to make correction for these aberrations, thereby achieving an increase of numerical aperture. For instance, when light emitted from one point is converted to parallel light beams, it is known that the spherical aberration can be perfectly corrected by use of an aspheric single lens having a spherical surface on the light source side and a nearly paraboloidal surface on the parallel light beam side. However, a problem with this case is that a failure in satisfying the sine condition results in a sharp coma increase at an increased field angle for the light beams. This problem may be solved by correcting the amount of deviation from the sine condition as much as possible to achieve an increased numerical aperture while spherical aberration is produced to a certain extent, as disclosed in JP-B's 46-18781 and 46-18782.

In addition, it is known that an aplanatic lens not only free from spherical aberration but meeting the sine condition as well can be obtained by use of a single lens having an aspherical shape at each surface. For instance, JP-B's 46-18781 and 46-18782 disclose a high F-number lens corrected for spherical aberration and the amount of deviation from the sine condition by use of a single lens having an aspherical shape at each surface. Likewise, JP-A 6-214155 discloses a high numerical-aperture condenser lens.

It is also possible to achieve an increased numerical aperture by combining an aspheric lens with a spherical lens, not by use of an aspheric single lens. For instance, JP-A 6-118301 shows a collector lens made up of, in order from a light source side, a positive spherical lens having a strong power and a meniscus plastic lens having an aspheric surface on one side and a positive power, thereby achieving a high numerical aperture.

With a prior art collector lens composed singly of a spherical lens, however, it is required to achieve an increased numerical aperture by making the collector lens as close to the light source as possible or increasing the outer diameter of the lens. Since the light source is generally covered with a glass tube, however, it is impossible to make the first surface of the collector lens on the light source side closer to the light source than a certain level. Further, the collector lens is generally designed to largely bend light rays to nearly parallel light beams by the strong positive power of the lens located on the light source side and, hence, the edge of the lens becomes thin as the outer diameter of the lens increases; however, such a lens cannot possibly be fabricated. Only by use of a spherical lens, it is thus difficult to ensure the numerical aperture of a collector lens as far as the limits of orientation characteristics of a light source.

Another possible approach to obtaining an increased numerical aperture is to divide a lens having a large positive power, thereby distributing the power. However, this incurs a large increase in the number of lenses, resulting in added cost, and a transmittance drop as well. In other words, it is not easy to obtain a collector lens having high illumination efficiency.

Some examples of the aspheric single lens having one aspheric surface, disclosed in JP-B's 46-18781 and 46-18782, may be fully corrected for spherical aberration and the amount of deviation from the sine condition, even when they are used for the inventive illumination system to be described later. In this case, however, the numerical aperture achieved is not very high or 0.65 or less. Even if this technique is applied to the inventive illumination system, it is then unlikely that the left side of Lagrange-Helmholtz equation (a) has a value sufficient to satisfy the numerical aperture of the objective and illuminate the range needed for viewing.

If an aspheric single lens having an aspherical shape at each surface is used as disclosed in JP-A 6-214155 and JP-B's 46-18781 and 46-18782, it is prima facie possible to meet an aplanatic condition. However, it is only the vicinity of the optical axis which satisfies the aplanatic condition; in other words, coma occurs at positions off the vicinity of the optical axis. To achieve uniform yet bright illumination, it is also required to ensure the vignetting of off-axis light rays. However, an illumination system having large coma is no longer said to be a uniform yet bright illumination system.

JP-A 6-118301 shows a collector lens made up of a double-convex lens and an aspheric lens having one aspheric surface and a positive power. Generally when a collector lens is composed of a positive lens alone, spherical aberration is under-produced while coma is largely produced in the form of inside coma. Even when one aspheric surface is used in combination with the positive lens, it is thus difficult to ensure sufficient numerical aperture while the spherical aberration and coma are corrected at the same time.

Generally, a light source has a certain limited service life, and so light source replacement is required after the lapse of a certain period of use. For easy light source replacement, there should preferable be some distance (the working distance WD of the collector lens) between the center of a light source and the apex of a surface in the collector lens, said surface located nearest to the light source side. In the case of a single lens having a relatively short focal length, however, the position of the principal point cannot largely be moved even by means of bending. With the aspheric single lenses disclosed in JP-A 6-214155 and JP-B's 46-18781 and 46-18782, each having an aspheric surface at each surface, it is difficult to make the working distance of the collector lens wide while the focal length of the collector lens is kept constant.

With the techniques disclosed in JP-A 6-214155 and JP-B's 46-18781 and 46-18782, a high numerical-aperture collector lens may be achieved by use of one lens having an aspheric surface at each surface. However, this collector lens offers a fabrication problem because both surfaces are defined by aspheric surfaces, and much difficulty is encountered in increasing the precision of the aspheric surfaces as well. In the examples disclosed in these publications, light having a high numerical aperture is converted by one single lens to parallel light beams. Such an aspheric single lens having an aspheric shape at each surface, even when it is fabricated with a slight fabrication error, is likely to produce aberrations such as higher-order spherical aberration and coma, failing to keep the numerical aperture high. With a single lens having an aspheric shape at each surface, therefore, it is prime facie possible to design a collector having a high numerical aperture. However, it is actually very difficult to fabricate a collector lens having a high numerical aperture.

Unless the optical axes of both surfaces of a lens are in proper alignment with each other, then a decentered image is formed with aberrations such as spherical aberration. Consequently, a blurred image is projected onto a position off a place onto which a proper image is to be projected. In the case of the aspheric lens having an aspheric shape at each surface, disclosed in JP-A 6-214155 and JP-B's 46-18781 and 46-18782, it is very difficult in view of fabrication to keep the optical axes of both surfaces in proper alignment with each other. In addition, the power of the aspheric single lens having an aspheric shape at each surface is too strong to reduce the amount of decentration of the projected image and the amount of aberrations produced due to a misalignment between the optical axes of the aspheric surfaces. Even when the techniques disclosed in JP-A 6-214155 and JP-B's 46-18781 and 46-18782 are applied to the illumination system according to the present invention, it is thus unlikely that the light converted by the collector lens to substantially parallel light beams is precisely transmitted to the objective.

SUMMARY OF THE INVENTION

In view of such problems as mentioned above, it is an object of the present invention to provide an illumination system which achieves a numerical aperture greater than the orientation characteristics of a light source and so ensures uniform yet bright illumination.

According to the present invention, this object is accomplished by the provision of an illumination system comprising a light source, a collector lens for converting light emitted from said light source to substantially parallel light beams, and a relay lens for transmitting said substantially parallel light beams to an objective, characterized in that said collector lens comprises a first positive lens group and a second negative lens group, and includes at least one aspheric optical element.

Preferably in this case, the working distance WD of the collector lens should satisfy the following condition (1):

$$0.5 < WD/f < 1.5 \qquad (1)$$

where WD is a distance from a center of the light source to an apex of a surface in the collector lens, which surface is located nearest to the light source, and f is a focal length of the collector lens.

In a preferable embodiment of the present invention, the aspheric optical element should be an aspheric lens having an aspherical shape at one surface and a spherical shape at another surface.

In another preferable embodiment of the present invention, the collector lens should satisfy the following condition (2):

$$|f_1/f_2| < 0.7 \qquad (2)$$

where $f_1$ is a focal length of the first lens group and $f_2$ is a focal length of the second lens group.

In yet another preferable embodiment of the present invention, the center radius-of-curvature of an aspheric surface of the aspheric optical element, which surface has a smallest center radius-of-curvature, should satisfy the following condition (3):

$$0.5 < R/f < 1.2 \qquad (3)$$

where R is the center radius-of-curvature of the aspheric surface of the aspheric optical element having the smallest center radius-of-curvature, and f is a focal length of the collector lens.

In a further preferable embodiment of the present invention, a lens element in the collector lens, which lens element is located nearest to the light source side, should be an aspheric lens.

In yet further preferable embodiment of the present invention, the aspheric optical element is made up of an aspheric lens while an Abbe constant $v_p$ of a lens in the first lens group, which lens has a largest Abbe constant, and an Abbe constant $v_n$ of a lens in the second lens group, which lens has a smallest Abbe constant, should satisfy the following condition (4):

$$\nu_p - \nu_n > 20 \quad (4)$$

where $\nu_p$ is the Abbe constant of the lens in the first lens group, which lens has the largest Abbe constant and $\nu_n$ is the Abbe constant of the lens in the second lens group, which lens has the smallest Abbe constant.

In what follows, why the aforesaid embodiments are used and how they act will be explained.

In the present invention, the collector lens includes at least one aspheric optical element and comprises a first positive lens group and a second negative lens group, so that spherical aberration under-produced and coma produced in the form of inside coma at the first lens group can be corrected by an aspheric effect to a certain extent. With spherical aberration over-produced and some coma produced in the form of outside coma at the second negative lens group, remnant aberrations at the first lens group, which cannot be corrected by the aspherical effect, are then corrected so that a numerical aperture greater than the limits of orientation characteristics of the light source can be ensured and off-axis coma produced far off the vicinity of the optical axis, too, can be corrected to achieve bright yet uniform illumination.

By the term "aspheric optical element" used herein is intended an aspheric lens, a dirractive optical element, and a gradient index lens.

With the collector lens comprising a first positive lens group and a second negative lens group according to the present invention, it is further possible to make use of the negative effect of the second lens group, thereby increasing the working distance WD of the collector lens without varying the focal length of the collector lens. However, it is to be noted that the working distance WD of the collector lens should satisfy the following condition (1):

$$0.5 < WD/f < 1.5 \quad (1)$$

where WD is the distance from the center of the light source to the apex of the surface in the collector lens, said surface located nearest to the light source, and f is the focal length of the collector lens.

If WD/f is less than 0.5, then the collector lens is too close to the light source, causing the replacement workability of the light source to become worse. If WD/f is greater than 1.5, then the height of a marginal ray incident on the collector lens located nearest to the light source becomes very high. Consequently, spherical aberration and coma cannot perfectly be corrected even by the aspherical effect or even by use of negative power, failing in maintaining any high numerical aperture.

In the present invention, it is desired that the aspheric optical element be an aspheric lens having an aspheric shape at one surface alone, because this lens can be more easily fabricated as compared with an aspheric lens having an aspheric surface at each surface, and so is advantageous thereover in terms of fabrication cost. In addition, it is possible to easily fabricate an aspheric lens with ever higher precision because it is easier to improve surface precision or align the optical axes of an aspheric surface and a spherical surface when compared with a lens having an aspheric shape at each surface.

Moreover in the present invention, it is required that the focal length $f_1$ of the first lens group including an aspheric lens and having a generally positive power and the focal length $f_2$ of the second lens group having a negative power satisfy the following condition (2):

$$|f_1/f_2| < 0.7 \quad (2)$$

where $f_1$ is the focal length of the first lens group and $f_2$ is the focal length of the second lens group.

If the ratio of the focal lengths of the first and second lens groups fails to satisfy condition (2), then the negative power of the second lens group becomes too strong with respect to the first lens group. Consequently, remnant aberrations at the first positive lens group and aspheric lens are over-corrected, failing in perfect correction of spherical aberration and coma.

To add to this, it is required in the present invention that the center radius-of-curvature of the aspheric lens in two or more aspheric lenses, which lens has the smallest center radius-of-curvature, satisfy the following condition (3):

$$0.5 < R/f < 1.2 \quad (3)$$

where R is the center radius-of-curvature of the aspheric surface having the smallest center radius-of-curvature, and f is the focal length of the collector lens.

By the "center radius-of-curvature" used herein is meant the radius of curvature of the apex of a lens surface.

As used herein, the aspheric surface is represented by the following equation (5):

$$Z = Y^2/[R + R\{1-(K+1)\times(Y/R)^2\}^{1/2}] + A_4 Y^4 + A_6 Y^6 + A_8 Y^8 + \quad (5)$$

where:

Z is coordinates for an optical axis direction,

R is a center radius-of-curvature for a Y-direction,

K is a conical coefficient, $A_4$ is a fourth aspherical coefficient, $A_6$ is a sixth aspherical coefficient, and $A_8$ is an eighth aspherical coefficient.

If R/f is greater than 1.2, then the aspherical effect of the aspheric lens having the smallest center radius-of-curvature in the first lens group or in two or more aspheric lenses included therein becomes too weak. Consequently, much more lenses are needed, resulting in added cost. When R/f is less than 0.5, the positive power of the aspheric lens becomes too large. Consequently, it is impossible to make any perfect correction for under spherical aberration produced at the aspheric lens, even when an aspheric surface or negative power is used.

Furthermore, it is required for the lens element of the collector lens located nearest to the light source side to have an aspheric shape. This is because the conversion of light having a high numerical aperture to parallel light beams is generally effected with correction of various aberrations by the second and subsequent lens elements, while the largest power is imparted to the lens element located nearest to the light source side. In this case, the largest aberration occurs at the first lens element. To avoid this, it is most effective to provide the lens element located nearest to the light source side with an aspheric surface, so that spherical aberration and coma produced at that surface can be corrected by the aspherical effect.

In the present invention, it is required to satisfy the following condition (4):

$$\nu_p - \nu_n > 20 \quad (4)$$

where $\nu_p$ is the Abbe constant of the lens in the first lens group, which lens has the largest Abbe constant and $\nu_n$ is the Abbe constant of the lens in the second lens group, which lens has the smallest Abbe constant.

By satisfying this condition, i.e., incorporating a lens having large dispersion in the second negative lens group rather than in the first positive lens group, it is possible to make correction for longitudinal chromatic aberration produced at the first lens group.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is a sectional view of Example 1 of the collector lens according to the present invention.

FIG. 4 is an aberration diagram illustrative of spherical aberration, astigmatism and coma as found in Example 1 according to back ray tracing.

FIG. 5 is a sectional view of Example 2 of the collector lens according to the present invention.

FIG. 6 is an aberration diagram illustrative of spherical aberration, astigmatism and coma as found in Example 2 according to back ray tracing.

FIG. 9 is a sectional view of Example 4 of the collector lens according to the present invention.

FIG. 10 is an aberration diagram illustrative of spherical aberration, astigmatism and coma as found in Example 4 according to back ray tracing.

DESCRIPTION OF THE PREFERRED EMBODIMENTS

The illumination system of the present invention will now be explained with reference to Examples 1 to 4.

EXAMPLE 1

Example 1 of the present invention is explained with reference to a vertical incident illumination system for microscopes.

Figure 1:
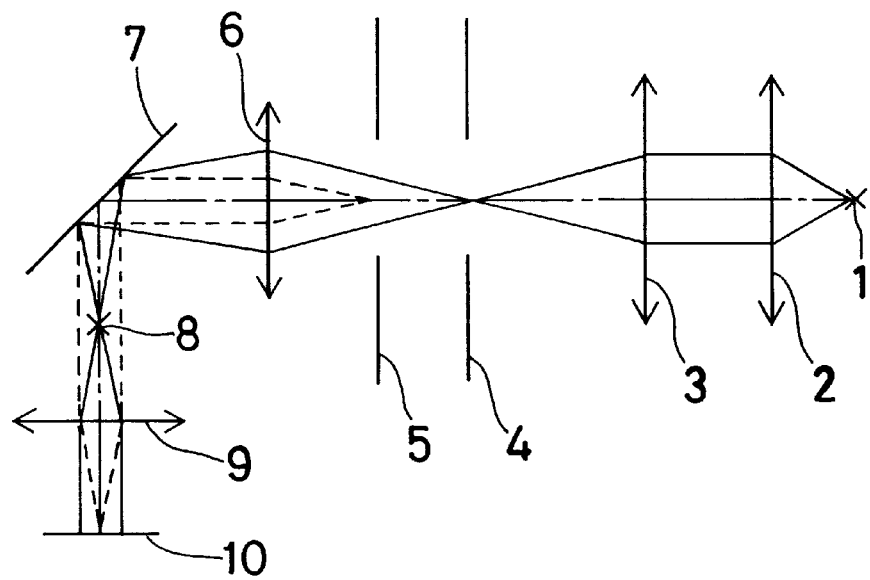
FIG. 1 is a general schematic of a vertical incident Köhler illumination optical system.
Figure 2:
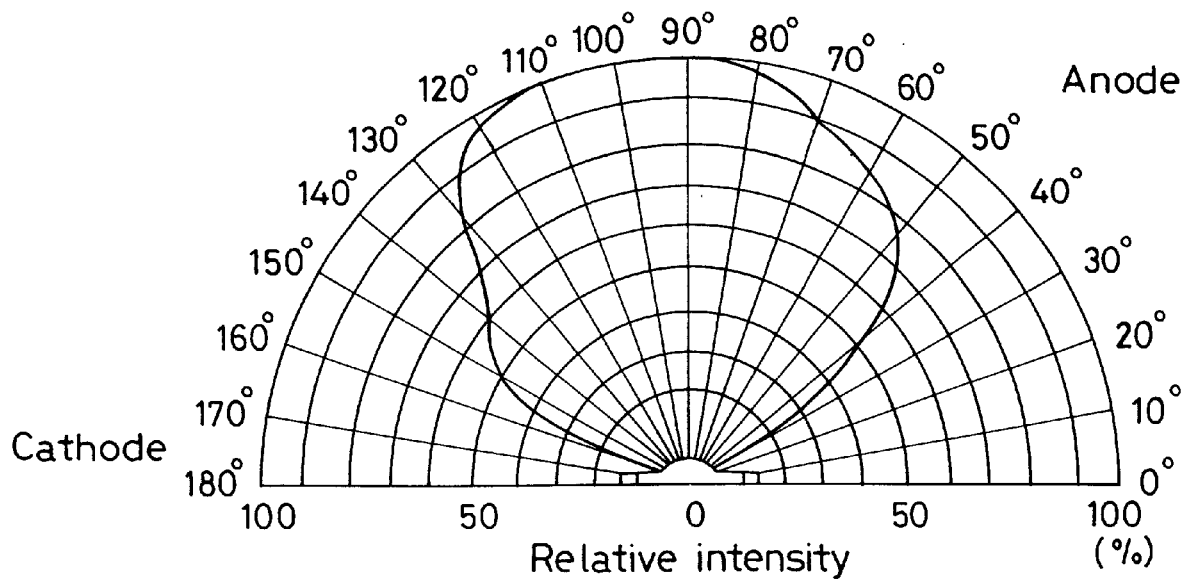
FIG. 2 is a diagram illustrative of the orientation characteristics of a light emitting portion of a mercury vapor lamp.

As shown in FIG. 1, the vertical incident illumination system is constructed such that light emitted from the light source 1 is converted by the collector lens 2 to substantially parallel light beams and the parallel light beams are then transmitted to the objective 9 by way of the relay optical elements 3 and 6. In the illumination system according to Example 1, only the arrangement of the collector lens is shown in the sectional view attached hereto as FIG. 3. As already noted, reference numerals 4, 5, 7, 8, and 10 in FIG. 1 denote the aperture stop, the field stop, the reflecting member such as a half-silvered or dichroic mirror, the vicinity of the pupil position of the objective 9, and the object surface, respectively.

The collector lens 2 is made up of a first lens group $G_1$ and a second lens group $G_2$. As can be seen from FIG. 3, the first lens group $G_1$ consists of, in order from a light source 1 side, a positive meniscus lens in which a convex surface opposite to an object surface 10 side is defined by an aspheric surface, a positive meniscus lens concave on the light source 1 side and a double-convex spherical lens, and the second lens group $G_2$ consists of a double-concave lens.

Numerical data about Example 1 will be described in Table 1, in which symbols $r_1, r_2, \ldots$ are the radii of curvature of lens surfaces as viewed in order from the light source 1 side (the radii of curvature of surface apexes in the case of aspheric surfaces), $d_0, d_1, \ldots$ are the spaces between lens surfaces as viewed in order from the light source 1 side (provided that $d_0$ is the space between the light source 1 and the first surface), $n_1, n_2, \ldots$ are the F-line (486.13 nm) refractive indices of lenses as viewed in order from the light source 1 side, $v_1, v_2, \ldots$ are the Abbe constants of lenses as viewed in order from the light source 1 side, $f_1$ is the F-line focal length of the first lens group $G_1$ in the collector lens, $f_2$ is the F-line focal length of the second lens group $G_2$, f is the overall focal length of the collector lens, WD is the working distance of the collector lens, R is the center radius-of-curvature of an aspheric lens, $v_p$ is the Abbe constant of the vitreous material having the largest Abbe constant in the first lens group $G_1$, and $v_n$ is the Abbe constant of the vitreous material having the smallest Abbe constant in the second lens group $G_2$.

In this example, the surface shape of $r_2$ is given by an aspheric surface, and the conical coefficient, fourth aspherical coefficient, sixth aspherical coefficient, and eighth aspherical coefficient in equation (5) are indicated by K, $A_4$, $A_6$, and $A_8$, respectively.

$d_8$ is the position onto which light beams emerging from the collector lens are projected. If emergent light beams are perfect parallel beams, then this value is infinite. In this example, however, $d_8$ has a finite and relatively large value because the emergent light beams are close to parallel light beams.

Spherical aberration, astigmatism and coma found in this example upon traced from the projection position of the collector lens back to the light source 1 are shown in FIGS. 4(a), 4(b) and 4(c), respectively.

EXAMPLE 2

This example is also directed to a vertical incident illumination system for microscopes.

As shown in FIG. 1, this vertical incident illumination system for microscopes is constructed such that light emitted from the light source 1 is converted by the collector lens 2 to substantially parallel light beams and the parallel light beams are then transmitted to the objective 9 by way of the relay optical elements 3 and 6. In the illumination system according to this example, only the arrangement of the collector lens 2 is shown in FIG. 5.

The collector lens 2 is made up of a first lens group $G_1$ and a second lens group $G_2$. As can be seen from FIG. 5, the first lens group $G_1$ consists of a double-convex lens in which a surface opposite to an object surface 10 side is defined by an aspheric surface, and the second lens group $G_2$ consists of a double-concave lens.

Numerical data about Example 2 will be given in Table 2, in which the same symbols as in Example 1 are used.

In this example, the surface shape of $r_2$ is defined by an aspheric surface.

$d_4$ is the position onto which light beams emerging from the collector lens are projected. If emergent light beams are perfect parallel beams, this value is infinite.

An aberration diagram for Example 2 similar to that for Example 1 is attached hereto as FIG. 6.

EXAMPLE 3

This example is also directed to a vertical incident illumination system for microscopes.

Figure 7:
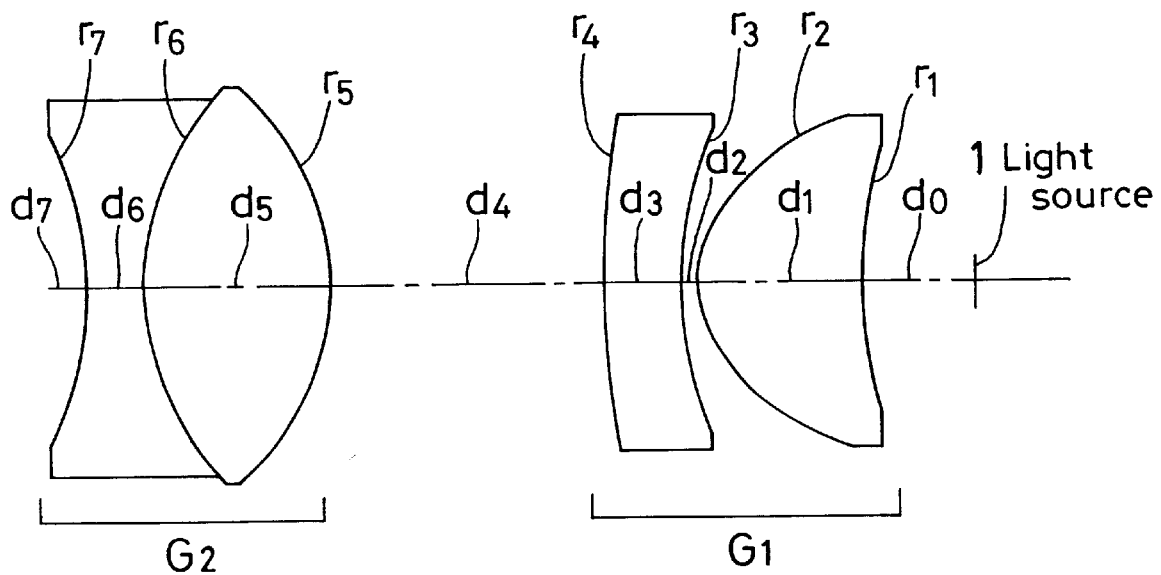
FIG. 7 is a sectional view of Example 3 of the collector lens according to the present invention.

As shown in FIG. 1, this vertical incident illumination system for microscopes is constructed such that light emitted from the light source 1 is converted by the collector lens 2 to substantially parallel light beams and the parallel light beams are then transmitted to the objective 9 by way of the relay optical elements 3 and 6. In the illumination system according to this example, only the arrangement of the collector lens 2 is shown in FIG. 7.

The collector lens 2 is made up of a first lens group $G_1$ and a second lens group $G_2$. As can be seen from FIG. 7, the first lens group $G_1$ consists of, in order from a light source 1 side, a positive meniscus lens in which a convex surface opposite to an object surface 10 side is defined by an aspheric surface and a negative meniscus lens concave on the light source 1 side, and the second lens group G2 consists of a doublet composed of, in order from the light source 1 side, a double-convex lens and a double-concave lens.

Numerical data about Example 3 will be given in Table 3, in which the same symbols as in Example 1 are used.

In this example, the surface shape of $r_2$ is defined by an aspheric surface.

$d_7$ is the position onto which light beams emerging from the collector lens are projected. If emergent light beams are perfect parallel beams, this value is infinite. In this example, however, $d_7$ has a finite and relatively large value because the emergent light beams are close to parallel light beams.

Figures 8A, 8B, 8C:
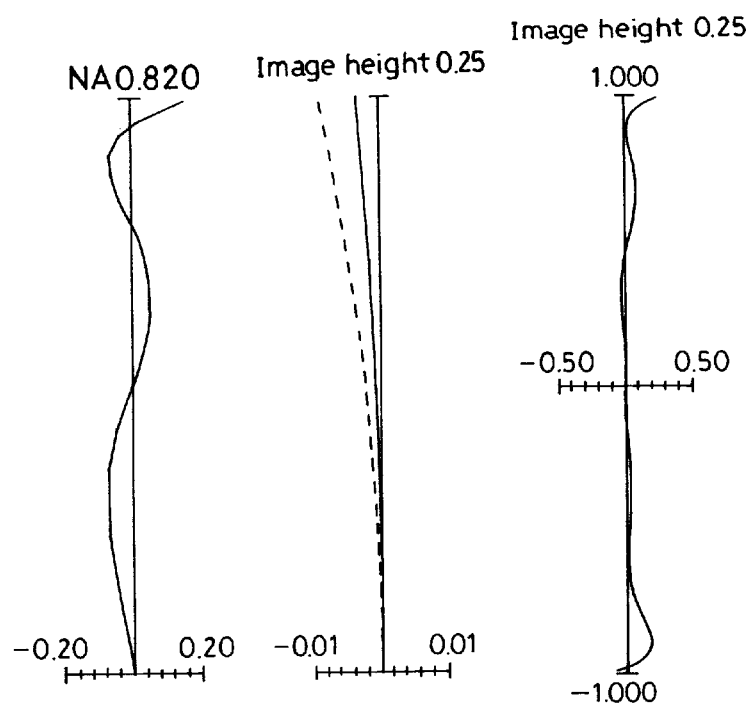
FIG. 8 is an aberration diagram illustrative of spherical aberration, astigmatism and coma as found in Example 3 according to back ray tracing.

An aberration diagram for Example 3 similar to that for Example 1 is attached hereto as FIG. 8.

EXAMPLE 4

This example is also directed to a vertical incident illumination system for microscopes.

As shown in FIG. 1, this vertical incident illumination system for microscopes is constructed such that light emitted from the light source 1 is converted by the collector lens 2 to substantially parallel light beams and the parallel light beams are then transmitted to the objective 9 by way of the relay optical elements 3 and 6. In the illumination system according to this example, only the arrangement of the collector lens 2 is shown in FIG. 9.

The collector lens 2 is made up of a first lens group $G_1$ and a second lens group $G_2$. As can be seen from FIG. 9, the first lens group $G_1$ consists of, in order from a light source 1 side, a positive meniscus lens in which a convex surface opposite to an object surface 10 side is defined by an aspheric surface and a double-convex lens, and the second lens group G2 consists of a double-concave lens in which a surface on the light source 1 side is defined by an apheric surface.

Numerical data about Example 4 will be given in Table 4, in which the same symbols as in Example 1 are used.

In this example, the surface shapes of $r_2$ and $r_5$ are each defined by an aspheric surface.

$d_6$ is the position onto which light beams emerging from the collector lens are projected. If emergent light beams are perfect parallel beams, this value is infinite. In this example, however, $d_6$ has a finite and relatively large value because the emergent light beams are close to parallel light beams.

An aberration diagram for Example 4 similar to that for Example 1 is attached hereto as FIG. 10.

In what follows, the numerical data about Examples 1 to 4 will be enumerated.

TABLE 1

$r_1 = -47.0729$         $d_0 = 14$
$r_2 = -17.5066$ (Aspheric)   $d_1 = 12.9515$   $n_1 = 1.79748$  $v_1 = 50$
$r_3 = -76.0179$         $d_2 = 0.2$
$r_4 = -33.6183$         $d_3 = 9.6778$   $n_2 = 1.49228$  $v_2 = 70.23$
$r_5 = 29.8272$          $d_4 = 0.3$
$r_6 = -112.8286$        $d_5 = 15.9968$  $n_3 = 1.52191$  $v_3 = 64.14$
$r_7 = -57.8565$         $d_6 = 3.5$
$r_8 = 30.1125$          $d_7 = 3$        $n_4 = 1.60619$  $v_4 = 39.29$
                         $d_8 = 1200$ Aspherical Coefficients
2nd surface $K = -0.3326$
$A_4 = 4.0808 \times 10^{-6}$
$A_6 = -2.5421 \times 10^{-8}$
$A_8 = 5.4149 \times 10^{-11}$
$f_1 = 17.10$
$f_2 = -32.26$
$f = 17.6$
$WD = 14$
$v_p = 70.23$
$v_n = 39.29$
$WD / f = 0.795$
$| f_1 / f_2 | = 0.53$
$R / f = 0.99$
$v_p - v_n = 30.94$

TABLE 2

$r_1 = 50.8207$              $d_0 = 12.6553$
$r_2 = -11.9126$ (Aspheric)  $d_1 = 18$        $n_1 = 1.52191$  $v_1 = 64.14$
$r_3 = -201.5701$            $d_2 = 28.8025$
$r_4 = 146.9947$             $d_3 = 3.1$       $n_2 = 1.60619$  $v_2 = 39.29$
                             $d_4 = \infty$ Aspherical Coefficients
2nd surface $K = -0.6751$
$A_4 = 2.3957 \times 10^{-6}$
$A_6 = -3.5058 \times 10^{-8}$
$A_8 = -2.7577 \times 10^{-10}$
$f_1 = 20.51$
$f_2 = -139.76$
$f = 18.9$
$WD = 12.6553$
$v_p = 64.14$
$v_n = 39.29$
$WD / f = 0.670$
$| f_1 / f_2 | = 0.15$
$R / f = 0.63$
$v_p - v_n = 24.85$

TABLE 3

$r_1 = -53.4008$              $d_0 = 11.0001$
$r_2 = -12.8851$ (Aspheric)   $d_1 = 16.5411$   $n_1 = 1.73844$  $v_1 = 54.68$
$r_3 = -38.4156$              $d_2 = 2$
$r_4 = -83.6947$              $d_3 = 8$         $n_2 = 1.63212$  $v_2 = 36.27$
$r_5 = 25.5379$               $d_4 = 27$
$r_6 = -27.7365$              $d_5 = 19$        $n_3 = 1.52191$  $v_3 = 64.14$
$r_7 = 32.5502$               $d_6 = 5$
                              $d_7 = -5000$     $n_4 = 1.63212$  $v_4 = 36.27$ Aspherical Coefficients
2nd surface $K = -0.5318$
$A_4 = 4.5023 \times 10^{-6}$
$A_6 = -4.6244 \times 10^{-8}$
$A_8 = 1.3355 \times 10^{-10}$
$f_1 = 19.6$
$f_2 = -168.15$
$f = 18.51$
$WD = 11.0001$
$v_p = 64.14$ TABLE 3-continued $v_n = 36.27$
$WD / f = 0.594$
$| f_1 / f_2 | = 0.12$
$R / f = 0.7$
$v_p - v_n = 27.87$

TABLE 4

| | $d_0 = 13.5$ | |
|---|---|---|
| $r_1 = -59.287$ | $d_1 = 23$ | $n_1 = 1.62757$ $v_1 = 60.28$ |
| $r_2 = -15.6961$ (Aspheric) | $d_2 = 0.3$ | |
| $r_3 = 36.0897$ | $d_3 = 16$ | $n_2 = 1.49228$ $v_2 = 70.23$ |
| $r_4 = -361.7042$ | $d_4 = 14.5835$ | |
| $r_5 = -41.19$ (Aspheric) | $d_5 = 3.5$ | $n_3 = 1.63212$ $v_3 = 36.27$ |
| $r_6 = 53.5609$ | $d_6 = 10000$ | |

Aspherical Coefficients
2nd surface $K = -0.5002$
$A_4 = -1.4696 \times 10^{-6}$
$A_6 = -9.8802 \times 10^{-10}$
$A_8 = 2.0280 \times 10^{-13}$ 5th surface $K = -10.2394$
$A_4 = -8.5828 \times 10^{-6}$
$A_6 = 1.7712 \times 10^{-8}$
$A_8 = 0$
$f_1 = 19.33$
$f_2 = -36.32$
$f = 17.40$
$WD = 13.5$
$v_p = 70.23$
$v_n = 36.27$
$WD / f = 0.775$
$| f_1 / f_2 | = 0.53$
$R / f = 0.902$
$v_p - v_n = 33.96$ Regarding each example, it is noted that when the sign of the value of the position ($d_8$ in Example 1) onto which the light beams emerging from the collector lens are projected is positive, the emergent light beams represent substantially parallel light beams converged to a considerably distant point that may be regarded as being a point at infinity, and when the sign is negative, the emergent light beams represent substantially parallel light beams diverging from a considerably distant point that may be regarded as being a point at infinity.

According to the present invention as explained above, spherical aberration and off-axis aberrations can be corrected by the aspherical effect and the negative lens in a well-balanced state, and the numerical aperture of the collector lens is ensured as far as the limits of the orientation characteristics of the light source, so that bright yet uniform illumination is achievable.

What is claimed is:

1. An illumination system comprising:
a light source;
a collector lens disposed in an optical path of said light source and constructed and arranged to convert light emitted from said light source to substantially parallel light beams,
said collector lens including a first positive lens group and a second negative lens group arranged in an optical path of said first positive lens group, and said collector lens including at least one aspheric optical element; and
a relay lens constructed and arranged to transmit said substantially parallel light beams to an objective.

2. An illumination system comprising:
a light source;
a collector lens disposed in an optical path of said light source and constructed and arranged to convert light emitted from said light source to substantially parallel light beams,
said collector lens including a first positive lens group and a second negative lens group arranged in an optical path of said first positive lens group, and said collector lens including at least one aspheric optical element; and
a relay lens constructed and arranged to transmit said substantially parallel light beams to an objective,
wherein said collector lens has a working distance WD satisfying the following condition (1):

$$0.5 < WD/f < 1.5 \tag{1}$$

where WD is a distance from a center of said light source to an apex of a surface in said collector lens, said surface located nearest to the light source, and f is a focal length of the collector lens.

3. The illumination system according to claim 1, wherein said aspheric optical element comprises an aspheric lens having an aspherical shape at one surface and a spherical shape at the other surface.

4. An illumination system comprising:
a light source;
a collector lens disposed in an optical path of said light source and constructed and arranged to convert light emitted from said light source to substantially parallel light beams,
said collector lens including a first positive lens group and a second negative lens group arranged in an optical path of said first positive lens group, and said collector lens including at least one aspheric optical element; and
a relay lens constructed and arranged to transmit said substantially parallel light beams to an objective,
wherein said collector lens has a working distance WD satisfying the following condition (1):

$$0.5 < WD/f < 1.5 \tag{1}$$

where WD is a distance from a center of said light source to an apex of a surface in said collector lens, said surface located nearest to the light source, and f is a focal length of the collector lens, and
wherein said collector lens satisfies the following condition (2):

$$f1/f2 \ 1 < 0.7 \tag{2}$$

where f1 is a focal length of said first lens group and f2 is a focal length of said second lens group.

5. An illumination system comprising:
a light source;
a collector lens disposed in an optical path of said light source and constructed and arranged to convert light emitted from said light source to substantially parallel light beams,
said collector lens including a first positive lens group and a second negative lens group arranged in an optical path of said first positive lens group, and said collector lens including at least one aspheric optical element; and
a relay lens constructed and arranged to transmit said substantially parallel light beams to an objective,
wherein said collector lens has a working distance WD satisfying the following condition (1):

$$0.5 < WD/f < 1.5 \quad (1)$$

where WD is a distance from a center of said light source to an apex of a surface in said collector lens, said surface located nearest to the light source, and f is a focal length of the collector lens, and wherein an aspheric surface of said aspheric optical element has a smallest center radius-of-curvature, said aspheric surface having a center radius-of-curvature satisfying the following condition (3):

$$0.5 < R/f < 1.2 \quad (3)$$

where R is the center radius-of-curvature of the aspheric surface of the aspheric optical element having the smallest center radius-of-curvature, and f is a focal length of said collector lens.

6. The illumination system according to claim 5, wherein a lens in the collector lens is an aspheric lens and said lens is located nearest to said light source side.

7. An illumination system comprising:

a light source;

a collector lens disposed in an optical path of said light source and constructed and arranged to convert light emitted from said light source to substantially parallel light beams, said collector lens including a first positive lens group and a second negative lens group arranged in an optical path of said first positive lens group, and said collector lens including at least one aspheric optical element; and a relay lens constructed and arranged to transmit said substantially parallel light beams to an objective, wherein said aspheric optical element is made up of an aspheric lens while an Abbe constant vp of a lens in said first lens group, said lens having a largest Abbe constant, and an Abbe constant vn of a lens in said second lens group, said lens having a smallest Abbe constant, satisfy the following condition (4):

$$vp - vn > 20$$

where vp is the Abbe constant of the lens in the first lens group having the largest Abbe constant and vn is the Abbe constant of the lens in the second lens group having the smallest Abbe constant.

8. The illumination system according to claim 1, wherein said first positive lens group includes said aspheric optical element.

* * * * *